United States Patent
Kannan et al.

(10) Patent No.: US 7,928,150 B2
(45) Date of Patent: Apr. 19, 2011

(54) PROCESS FOR THE MANUFACTURE OF LONOMERIC POLYBUTYLENE TEREPHTHALATE FROM POLYETHYLENE TEREPHTHALATE, AND COMPOSITIONS AND ARTICLES THEREOF

(75) Inventors: Ganesh Kannan, Evansville, IN (US);
Dhaval Shah, Evansville, IN (US);
Rama Konduri, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 342 days.

(21) Appl. No.: 12/115,753

(22) Filed: May 6, 2008

(65) Prior Publication Data

US 2009/0281204 A1 Nov. 12, 2009

(51) Int. Cl.
*C08J 9/00* (2006.01)
(52) U.S. Cl. .......................................... 521/48; 521/48.5
(58) Field of Classification Search ..................... 521/48, 521/48.5
See application file for complete search history.

(56) References Cited

U.S. PATENT DOCUMENTS

| | | | |
|---|---|---|---|
| 2,465,319 A | 3/1949 | Whinfield et al. |
| 2,720,502 A | 10/1955 | Caldwell et al. |
| 2,727,881 A | 12/1955 | Caldwell et al. |
| 2,822,348 A | 2/1958 | Haslam et al. |
| 3,047,539 A | 7/1962 | Pengilly et al. |
| 3,907,868 A | 9/1975 | Currie et al. |
| 4,011,285 A | 3/1977 | Seymour et al. |
| 4,128,526 A | 12/1978 | Borman |
| 4,203,887 A | 5/1980 | Goedde et al. |
| 4,609,680 A | 9/1986 | Fujita et al. |
| 5,266,601 A | 11/1993 | Kyber et al. |
| 5,300,572 A | 4/1994 | Tajima et al. |
| 5,326,806 A | 7/1994 | Yokoshima et al. |
| 5,413,681 A | 5/1995 | Tustin et al. |
| 5,451,611 A | 9/1995 | Chilukuri et al. |
| 5,559,159 A | 9/1996 | Sublett et al. |
| 5,858,551 A | 1/1999 | Salsman |
| 6,162,837 A | 12/2000 | Gerking et al. |
| 6,255,371 B1 | 7/2001 | Schlosser et al. |
| 6,410,607 B1 | 6/2002 | Ekart et al. |
| 6,515,044 B1 | 2/2003 | Idel et al. |
| 6,518,322 B1 | 2/2003 | West |
| 6,689,838 B1 | 2/2004 | Fischer et al. |
| 6,706,843 B1 | 3/2004 | Ishihara et al. |
| 6,794,463 B2 | 9/2004 | Aramaki et al. |
| 6,887,909 B2 | 5/2005 | Kawamura et al. |
| 7,179,869 B2 | 2/2007 | Hirokane et al. |
| 7,183,362 B2 | 2/2007 | Hirokane et al. |
| 7,388,067 B2 | 6/2008 | Leemans et al. |
| 2001/0009944 A1 | 7/2001 | Chisholm et al. |
| 2002/0012807 A1 | 1/2002 | Kurian et al. |
| 2004/0059084 A1 | 3/2004 | Hirokane et al. |
| 2007/0208160 A1 | 9/2007 | Agarwal et al. |
| 2007/0275242 A1 | 11/2007 | Gopal et al. |
| 2007/0276069 A1 | 11/2007 | Agarwal et al. |

FOREIGN PATENT DOCUMENTS

| | | |
|---|---|---|
| EP | 518703 A2 | 12/1992 |
| EP | 0683201 A1 | 11/1995 |
| EP | 1437377 A1 | 7/2004 |
| GB | 1500577 | 2/1978 |
| JP | 2000256472 | 9/2000 |
| JP | 2000256920 | 9/2000 |
| JP | 2005089572 A | 4/2005 |
| KR | 20010083551 | 9/2001 |
| WO | 03066704 A1 | 8/2003 |
| WO | 2006025827 A1 | 5/2008 |

OTHER PUBLICATIONS

JP04-345655; Published Jan. 12, 1992; Teijin LTD; "Flame-Retardant Resin Composition"; Engilsh Abstract, only one page.
Hale, et al.; "Compatibilization of PBT/ABS Blends by Methyl Methacrylate-Glycidyl Methacrylate-Ethyl Acrylate Terpolymers"; Polymer; 40; pp. 365-377; (1999).
Hale, et al.; "Compatibilization of PBT/ABS Blends by Methyl Methacrylate-Glycidyl Methacrylate-Ethyl Acrylate Terpolymers"; Polymer; vol. 40; pp. 365-377; (1999).
Japanese Publication No. 2005089572, Publication date: Apr. 7, 2005, Abstract, 1 page.
"GE Gives Plastic Bottle Recycling a New Spin"; ChemicalProcessing.com, Aug. 25, 2006 [online], accessed via the internet [retrieved on Oct. 16, 2009], URS: <http://www.chemicalprocessing.com/industrynews/2006/056.html>; 2 pages.
Pawlak, et al.; European Polymer Journal, 2000, 36, p. 1875-1884.

*Primary Examiner* — Edward J Cain
(74) *Attorney, Agent, or Firm* — Cantor Colburn LLP; Diderico van Eyl

(57) ABSTRACT

An ionomeric, modified poly(1,4-butylene terephthalate) copolymer comprising: polyester units comprising non-ionomeric ester units and ionomeric ester units substituted with an inorganic ionic group; and polyester units having at least one residue that is derived from a polyethylene terephthalate component selected from the group consisting of polyethylene terephthalate and polyethylene terephthalate copolymers is described.

43 Claims, 4 Drawing Sheets

US 7,928,150 B2

PROCESS FOR THE MANUFACTURE OF LONOMERIC POLYBUTYLENE TEREPHTHALATE FROM POLYETHYLENE TEREPHTHALATE, AND COMPOSITIONS AND ARTICLES THEREOF

BACKGROUND

Polybutylene terephthalate (also referred to as "PBT") is used in a wide variety of applications. For example, blends of PBT with polyamide can have improved heat resistance and water absorption resistance. The expansion of the field of use of PBT-polymer blends, however, has brought about an ever-increasing demand for an improvement in the performance of such blends, in particular improved toughness, impact resistance, heat resistance, and alkali resistance. In addition, even when PBT and a polyamide are blended and melt-mixed, it can be difficult to attain a homogeneous dispersion. In injection-molded articles in particular, the surface layer of the articles have a laminar structure, such that severe peeling can occur at the surface.

Another drawback of PBT-polymer blends is that such blends generally are not made from recycle sources of PBT. This is due at least in part to the lack of availability of PBT recycle streams.

There accordingly remains a need for further improvement in the properties of PBT-polyamide blends. There especially remains a need to improve the compatibility of PBT-polyamide blends, in order to provide improved mechanical properties and bonding to other polymers. It would further be advantageous to improve the surface delamination observed in PBT-polymer blends. It would also be advantageous if the PBT used in such blends could be derived from a renewable or recycled source, such as scrap polyethylene terephthalate (PET).

SUMMARY

One or more of the above described drawbacks and disadvantages can be alleviated or minimized by an ionomeric, modified poly(1,4-butylene terephthalate) copolymer comprising: polyester units comprising non-ionomeric ester units and ionomeric ester units substituted with an inorganic ionic group; and polyester units having at least one residue that is derived from a polyethylene terephthalate component selected from the group consisting of polyethylene terephthalate and polyethylene terephthalate copolymers.

Also described is an article comprising the above-described composition.

A method of forming an article comprises shaping, extruding, calendaring, or molding a composition comprising the ionomeric, modified poly(1,4-butylene terephthalate) copolymer to form the article.

In still another embodiment, a composition comprises the ionomeric, modified poly(1,4-butylene terephthalate) copolymer and a polyamide.

Articles comprising the ionomeric, modified poly(1,4-butylene terephthalate) copolymer are also described.

A method of forming an article comprises shaping, extruding, calendaring, or molding a composition comprising the ionomeric, modified poly(1,4-butylene terephthalate) copolymer and a polyamide to form the article.

In still another embodiment, a process for the production of an ionomeric, modified poly(1,4-butylene terephthalate) copolymer comprises:

(a) depolymerizing a poly(ethylene terephthalate) component selected from the group consisting of poly(ethylene terephthalate) and poly(ethylene terephthalate) copolymers, in the presence of a 1,4-butanediol component and an aromatic dicarboxylic acid containing an inorganic ionic group, at a temperature from 180° C. to 230° C., under agitation, at a pressure that is at least atmospheric pressure in the presence of a catalyst component, under an inert atmosphere, to produce a molten mixture comprising a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butanediol, ethylene glycol, and combinations thereof, and (b) increasing the temperature of the molten mixture with agitation and at subatmospheric pressure under conditions sufficient to form the ionomeric, modified poly(1,4-butylene terephthalate) copolymer.

In yet another embodiment, a process for the manufacture of an ionomeric, modified poly(1,4-butylene terephthalate) copolymer comprises:

(a) reacting (i) a poly(ethylene terephthalate) component selected from the group consisting of poly(ethylene terephthalate) and poly(ethylene terephthalate) copolymers with (ii) a diol component selected from the group consisting of ethylene glycol, propylene glycol, and combinations thereof, in a reactor at a pressure that is at least atmospheric pressure in the presence of a catalyst component at a temperature ranging from 190° C. to 250° C., under an inert atmosphere, under conditions sufficient to depolymerize the poly(ethylene terephthalate), to form a first molten mixture comprising components selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, propylene glycol and combinations thereof, wherein the poly(ethylene terephthalate) component and the diol component are combined under agitation;

(b) adding 1,4-butanediol and an aromatic dicarboxylic acid or a chemical equivalent thereof containing an inorganic ionic group to the first molten mixture in a reactor in the presence of a catalyst component at a temperature from 190° C. to 240° C., under conditions that are sufficient to form a second molten mixture comprising a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, oligomers containing butylene terephthalate moieties, oligomers containing butylene isophthalate moieties, covalently bonded oligomeric moieties containing at least two of the foregoing moieties, 1,4-butanediol, propylene glycol, ethylene glycol, and combinations thereof, and (c) increasing the temperature of the second molten mixture under subatmospheric conditions and agitation to a temperature from 240° C. to 260° C., thereby forming the ionomeric, modified poly(1,4-butylene terephthalate) copolymer;

wherein an aromatic dicarboxylic acid containing an inorganic ionic group is added during the process prior to formation of the ionomeric, modified poly(1,4-butylene terephthalate) copolymer.

DETAILED DESCRIPTION OF THE PREFERRED EMBODIMENTS

Figure 1:
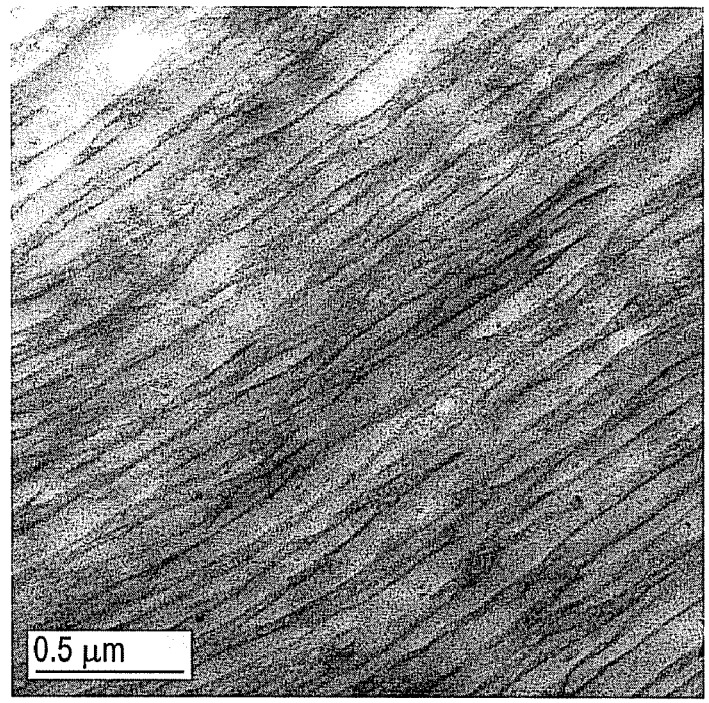
FIG. 1 is a transmission electron microscopy (TEM) image of a molded sample of the composition of Example 3 (scale bar=0.5 micrometers).

The inventors hereof have discovered that it is now possible to make an ionomeric, modified poly(1,4-butylene terephthalate) copolymer that is derived from scrap polyethylene terephthalate. The ionomeric, modified PBT copolymer performs similarly to ionomeric PBT that is derived from monomers. In particular, the ionomeric, modified PBT copolymer can be used in the manufacture of polyamide blends having improved properties. For example the blends can be used to manufacture fibers with lower surface delamination.

Unlike conventional compositions containing virgin PBT (PBT that is derived from monomers), the ionomeric, modified PBT copolymer contains a polyethylene terephthalate residue, e.g., a material derived from ethylene glycol or isophthalic acid (components that are not present in virgin, monomer-based PBT). Use of ionomeric, modified PBT copolymer can provide a valuable way to effectively use underutilized scrap PET (from post-consumer or post-industrial streams) in PBT-polymer blends, thereby conserving non-renewable resources and reducing the formation of greenhouse gases, e.g., $CO_2$. In one embodiment, the ionomeric, modified PBT copolymer can further be derived from a biomass-derived 1,4-butanediol, e.g. corn-derived 1,4-butanediol or a 1,4-butanediol derived from a cellulosic material.

As used herein the singular forms "a," "an," and "the" include plural referents. The term "combination" is inclusive of blends, mixtures, alloys, reaction products, and the like. Unless defined otherwise, technical and scientific terms used herein have the same meaning as is commonly understood by one of skill. Compounds are described using standard nomenclature. The term "and a combination thereof" is inclusive of the named component and/or other components not specifically named that have essentially the same function.

The term "random copolymer," as used in this application refers to a copolymer that includes macromolecules in which the probability of finding a given monomeric unit at any given site in the chain is independent of the nature of the adjacent units.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The term "from more than 0 to" an amount means that the named component is present in some amount more than 0, and up to and including the higher named amount.

All ASTM tests and data are from the 2003 edition of the Annual Book of ASTM Standards unless otherwise indicated.

With respect to the terms "terephthalic acid group," "isophthalic acid group," "ethylene glycol group," "butanediol group," and "diethylene glycol group" being used to indicate, for example, the weight % of the group in a molecule, the term "isophthalic acid group(s)" means the group or residue of having the formula (—O(CO)C$_6$H$_4$(CO)—), the term "terephthalic acid group(s)" means the group or residue isophthalic acid having the formula (—O(CO)C$_6$H$_4$(CO)—), the term diethylene glycol group means the group or residue of diethylene glycol having the formula (—O(C$_2$H$_4$)O (C$_2$H$_4$)—), the term "butanediol group(s)" means the group or residue of butanediol having the formula (—O(C$_4$H$_8$)—), and the term "ethylene glycol groups(s)" means the group or residue of ethylene glycol having the formula (—O (C$_2$H$_4$)—).

In general, the ionomeric, modified PBT copolymer is made by a process wherein the PET component is depolymerized, followed by polymerization of the depolymerized PET component with 1,4-butanediol and a source of the ionomeric groups, in particular an aromatic dicarboxylic acid or its chemical equivalent having an ionic group, and a catalyst.

The PET component from which the ionomeric, modified PBT copolymer is made can be in a variety of forms. Generally, the PET component includes recycle (scrap) PET in flake, powder/chip, film, or pellet form. Before use, the PET is generally processed to remove impurities such as paper, adhesives, polyolefin, e.g., polypropylene, polyvinyl chloride (PVC), nylon, polylactic acid, and other contaminants. Also, the PET component can include PET that is not waste in flake, chip, or pellet form. As such, PET that would ordinarily be deposited in landfills can now be used productively and effectively. In one embodiment, the PET component can also include other polyesters and/or polyester copolymers. Examples of such materials include polyalkylene terephthalates such as polyethylene terephthalate, polycyclohexane terephthalate, copolyesters of terephthalate esters with comonomers containing cyclohexanedimethanol and ethylene glycol, copolyesters of terephthalic acid with comonomers containing cyclohexanedimethanol and ethylene glycol, polybutylene terephthalate, polyxylylene terephthalate, polydianol terephthalates, polytrimethylene terephthalate, polyester naphthalates, and combinations thereof.

In one embodiment, the 1,4-butanediol used in the manufacture of the ionomeric modified PBT copolymer component is derived all or in part from a biomass, e.g., is a corn-derived 1,4-butanediol or a 1,4-butanediol derived from a cellulosic material. The term "biomass" means living or dead biological matter that can be directly or subsequently converted to useful chemical substances that are ordinarily derived from non-renewable hydrocarbon sources. Biomass can include cellulosic materials, grains, starches derived from grains, fatty acids, plant based oils, among others. When this embodiment is used, the manufacture of compositions containing the modified polybutylene terephthalate can further reduce $CO_2$ emissions that are ordinary generated when PBT is made from fossil fuel derived monomers. Also, this further reduces the amount of non-renewable hydrocarbon sources that are used in order to make the PBT.

The source of the ionomeric groups in the ionomeric, modified PBT copolymer is an aromatic dicarboxylic acid or chemical equivalent thereof containing an inorganic ionic group. The ionic groups can be phosphate, sulfonate, nitrate, sulfate, phosphate, phosphonate groups, or sulfonate groups. In one embodiment, the ionic groups are sulfonate groups. The aromatic group can be derived from benzene, naphthalene, anthracene, biphenyl, terphenyl, oxydiphenyl, sulfonyl diphenyl or $C_{1-4}$ alkyl diphenyl. From 1 to 3 ionic groups can be present. The dicarboxylic acid can be a monoaryl or diaryl diacid such as terephthalic acid, isophthalic acid, and naphthalenedicarboxylic acid. The various isomers of naphthalenedicarboxylic acid such as 1,4-, 2,6- and the like can be used. Chemical equivalents of the diacids include the corresponding carbonyl halide (e.g., carbonyl chloride), and $C_{1-3}$ diesters.

Exemplary an aromatic dicarboxylic acids or chemical equivalents thereof containing an inorganic ionic group include sodium sulfo isophthalic acid, potassium sulfo terephthalic acid, sodium sulfo naphthalene dicarboxylic acid, calcium sulfo isophthalate, potassium 4,4'-di(carbomethoxy)biphenyl sulfonate, lithium 3,5-di(carbomethoxy)benzene sulfonate, sodio 4-sulfo naphthalene-2,7-dicarboxylic acid, 4-lithio sulfophenyl-3,5-dicarboxy benzene sulfonate, 6-sodiosulfo-2-naphthyl-3,5-dicarbomethoxy benzene sulfonate, and dimethyl 5-[4-(sodiosulfo)phenoxy]isophthalate. A specific aromatic dicarboxylic acid or chemical equivalent thereof containing an inorganic ionic group is dimethyl-5-sodiosulfo-1,3-phenylenedicarboxylate(dimethyl sulfonated isophthalate).

In one specific method for the manufacture the ionomeric, modified PBT copolymer, the PET component is (a) depolymerized in the presence of 1,4-butanediol, an aromatic dicarboxylic acid containing an inorganic ionic group, and a catalyst to provide a molten mixture of oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, and covalently bonded oligomeric moieties containing at least two of the foregoing moieties. Suitable conditions for effecting the depolymerization include a pressure that is at least atmospheric pressure; a temperature ranging from 180° C. to 230° C.; and an inert atmosphere.

In a subsequent step (b), the temperature of the molten mixture is raised, and the pressure is decreased to subatmospheric pressure, to form the ionomeric, modified PBT copolymer, comprising polyester units selected from the following formulas (1), (2), (3), (4), (5), and (6):

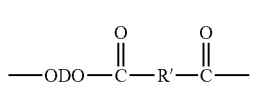
(1)

-continued

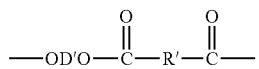
(2)

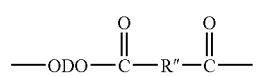
(3)

(4)

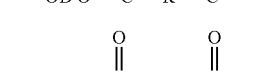
(5)

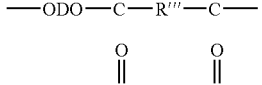
(6)

wherein D is a 1,4-butylene (—($C_4H_8$)—); D' is ethylene (—($C_2H_4$)—); R' is terephthalylene (-1,4-($C_6H_4$)—); R'' is an isophthalylene (-1,3-($C_6H_4$)—); and R''' is the divalent decarboxylated residue of the aromatic dicarboxylic acid containing an inorganic ionic group. In one embodiment, R''' has the formula:

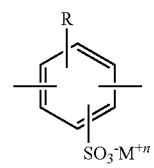

wherein R is hydrogen, halogen, $C_{1-4}$ alkyl or $C_{6-12}$ aryl; M is a metal, and n is 1 to 5, such that the ionomeric, modified poly(1,4-butylene terephthalate) copolymer comprises divalent ionomer units of the formula:

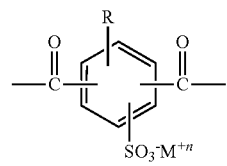

wherein R is hydrogen, halogen, $C_{1-8}$ alkyl or $C_{6-12}$ aryl; M is a metal, and n is 1 to 5.

The 1,4-butanediol can be continuously refluxed back into the reactor during the depolymerization. In one embodiment, 1,4-butanediol is refluxed back into the reactor during depolymerization (step (a)). In another embodiment, excess 1,4-butanediol, ethylene glycol, and tetrahydrofuran are removed during depolymerization (step (b)).

The PET component and the 1,4-butanediol component are generally combined under atmospheric pressure. It is also possible to use pressures that are higher than atmospheric pressures. For instance, in one embodiment, the pressure at which the PET component and the 1,4-butanediol are subjected to is 2 atmospheres, or higher. With higher pressures, depolymerization can occur at temperatures higher than 230° C.

The temperature at which the PET component, the 1,4-butanediol, and the aromatic dicarboxylic acid containing an inorganic ionic group are combined and reacted is sufficient to promote depolymerization of the PET component into components such as polyethylene terephthalate and polybutylene terephthalate oligomers, 1,4-butanediol, and ethylene glycol. More particularly, the PET component is depolymerized into oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, and covalently bonded oligomeric moieties containing at least two of the foregoing moieties. The temperature at which the PET component and the 1,4-butanediol component are combined is generally from 180° C. to 230° C.

The 1,4-butanediol is generally used in excess amount relative to the PET component. In one embodiment, 1,4-butanediol is used in a molar excess amount ranging from 2 to 20, based on the moles of polyethylene terephthalate repeating unit. The amount of the aromatic dicarboxylic acid containing an inorganic ionic group will depend on the desired amount of ionic groups in the product PBT copolymer. The aromatic dicarboxylic acid or a chemical equivalent thereof containing an inorganic ionic group is added in a molar amount that is in at least 1.2 times molar excess relative to the molar amount of ionic aromatic dicarboxylic acid or a chemical equivalent thereof incorporated into the ionomeric, modified PBT copolymer.

During the initial stage of the process when the PET component and the 1,4-butanediol are combined and reacted (step (a)), the PET component depolymerizes into a molten mixture. As described above, the molten mixture contains at least polyethylene terephthalate and poly(butylenes terephthalate) oligomers, 1,4-butanediol, and ethylene glycol. The 1,4-butanediol and ethylene glycol are generally recirculated, and tetrahydrofuran is distilled off during this step of the process. In one embodiment, the PET component can be further depolymerized with ethylene glycol.

The duration of the step in which PET component reacts with 1,4-butanediol can vary, depending on factors such as the equipment used, production needs, desired final properties, and the like. In one embodiment, this step is carried out in at least 2 hours. In another embodiment, the step is carried out in from 2 to 5 hours.

The process further includes the step of subjecting the molten mixture to subatmospheric pressure, and increasing the temperature of the molten mixture to a temperature from 240 to 260° C., thereby forming the ionomeric, modified PBT copolymer derived from the PET component (step (b)).

Generally, the molten mixture pressure is subjected to a pressure from subatmospheric to less than 1 Torr. In one embodiment, the pressure is reduced to a pressure from 100 to 0.05 Torr in a continuous manner. In another embodiment, the pressure is reduced to a pressure from 10 to 0.1 Torr in a continuous fashion. Advantageously, the molten mixture can be placed under subatmospheric conditions without isolation and dissolution of any material from the molten mixture. The avoidance of this step greatly enhances the utility of the process.

The temperature at which the molten mixture is placed under subatmospheric conditions is sufficiently high to promote polymerization of the polyethylene terephthalate and polybutylene terephthalate oligomers, 1,4-butanediol, and ethylene glycol. Generally, the temperature is at least 230° C. In one embodiment, the temperature is from 250 to 275° C.

During the step when the molten mixture is placed under subatmospheric conditions and the temperature is increased, excess 1,4-butanediol, ethylene glycol, and tetrahydrofuran (THF) can be removed from the reactor and oligomers are allowed to build in molecular weight. Agitation can be continuously provided to facilitate the removal of the low boiling components. After sufficient molecular weight is obtained, the resulting molten PBT polymer is dropped from the reactor, cooled, stranded, and chopped into pellets.

The duration of the step in which the molten mixture polymerizes from polyethylene terephthalate and polybutylene terephthalate oligomers, 1,4-butanediol, and ethylene glycol can vary, depending on factors such as the equipment used, production needs, desired final properties, and the like. In one embodiment, step (b) is carried out in at least two hours. In another embodiment, the step is carried out from 30 minutes or from 2 to 5 hours.

Both steps of the process can be carried out in the same reactor. In one embodiment, however, the process is carried out in two separate reactors, where step (a) is carried out in a first reactor and when the molten mixture has formed, the molten mixture is placed in a second reactor and step (b) is carried out. In another embodiment, the process can be carried out in more than two reactors. In another embodiment, the process can be carried out in a continuous series of reactors.

A catalyst can be used to facilitate the reaction. Exemplary catalysts include antimony compounds, tin compounds, titanium compounds, combinations thereof as well as many other metal catalysts and combinations of metal catalysts that have been disclosed in the literature. The amount of the catalyst will vary depending on the specific reaction components and conditions, and can be from 1 to 5000 ppm, or more. The catalyst component is generally added in step (a), during the initial combining of the PET component, the 1,4-butanediol, and the ionic monomer. In another embodiment, the catalyst component can be added the molten mixture that forms after the PET component and the 1,4-butanediol are combined and reacted.

The process for making the modified copolymer is preferably carried out under agitative conditions. The term "agitative conditions" or "agitation" refers to subjecting the PET component and the 1,4-butanediol to conditions that involve physically mixing the PET component and 1,4-butanediol and that promote the depolymerization of the PET in step (a), and/or subjecting the molten mixture to conditions that involve physically mixing molten mixture to promote polymerization from polyethylene terephthalate oligomers, polybutylene terephthalate oligomers, 1,4-butanediol, and ethylene glycol in step (b). The physical mixing can be accomplished by methods known in the art. In one embodiment, a mixer containing rotating shaft and blades that are perpendicular to the shaft is used.

The process can include a step that reduces the amount of THF produced during the process by adding a basic compound containing an alkali metal to the reactor in step (a) and thereby reducing formation of THF. The basic compound contains an alkali metal and can be, for example, sodium alkoxides, sodium hydroxide, sodium acetate, sodium carbonate, sodium bicarbonates, potassium alkoxides, potassium hydroxide, potassium acetate, potassium carbonate, potassium bicarbonate, lithium alkoxides, lithium hydroxide, lithium acetate, lithium carbonate, lithium bicarbonate, calcium alkoxides, calcium hydroxide, calcium acetate, calcium carbonate, calcium bicarbonates, magnesium alkoxides, magnesium hydroxide, magnesium acetate, magnesium carbonate, magnesium bicarbonates, aluminum alkoxides, aluminum hydroxide, aluminum acetate, aluminum carbonate, aluminum bicarbonates, and combinations thereof. The amount of the basic compound added to a mixture is generally at least 0.1 ppm, specifically from 0.1 to 50 ppm, more specifically from 1 to 10 ppm, each based on the parts by weight of the modified poly(1,4-butylene terephthalate) copolymer. The addition of the basic compound containing an alkali metal can reduce the amount of total THF production, as compared to when the process is carried out without the basic compound. In one embodiment, the total THF produced during the process is reduced by at least 10%, as compared to a process that does not use the basic compound. In another embodiment, the total THF produced during the process is reduced ranges from at least 10% to 50%, or more. In another embodiment, the THF is reduced from at least 10% to 50%.

A difunctional epoxy compound can optionally be added to reduce the formation of THF. The epoxy compounds may be selected from the group of difunctional epoxies. Examples of suitable difunctional epoxy compounds include 3,4-epoxycyclohexyl-3,4-epoxycyclohexyl carboxylate, bis(3,4-epoxycyclohexylmethyl)adipate, vinylcyclohexene di-epoxide, bisphenol diglycidyl ethers such as bisphenol-A diglycidyl ether, tetrabromobisphenol-A diglycidyl ether, glycidol, diglycidyl adducts of amines and amides, diglycidyl adducts of carboxylic acids such as the diglycidyl ester of phthalic acid the diglycidyl ester of hexahydrophthalic acid, and bis(3,4-epoxy-6-methylcyclohexylmethyl)adipate, butadiene diepoxide, vinylcyclohexene diepoxide, dicyclopentadiene diepoxide, and the like. Especially preferred is 3,4-epoxycyclohexyl-3,4-epoxycyclohexylcarboxylate. The amount of the epoxy added to the mixture is generally at least 0.05 wt. %, specifically from 0.1 to 1 wt. %, more specifically from 0.2 to 0.5 wt. %, each based on the weight of the ionomeric, modified poly(1,4-butylene terephthalate) copolymer.

In another method for the manufacture the ionomeric, modified PBT copolymer, a three-step process is used. In this process, the PET component is (a) depolymerized in the presence of ethylene glycol, propylene glycol, or a combination thereof, under conditions effective to provide a first molten mixture of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing tributylene isophthalate moieties, and covalently bonded oligomeric moieties containing at least two of the foregoing moieties. Suitable conditions for effecting the depolymerization include a pressure that is at least atmospheric pressure; a temperature ranging from 190° C. to 250° C.; and an inert atmosphere. The depolymerization of the PET component can be carried out for various times. In one embodiment, the depolymerization is carried out for at least 25 minutes.

In step (b), 1,4-butanediol is added to the first molten mixture under conditions that are effective to form a second molten mixture containing a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, oligomers containing butylene terephthalate moieties, oligomers containing butylene isophthalate moieties, covalently bonded oligomeric moieties containing at least two of the foregoing moieties, and combinations thereof. Suitable conditions for forming the second molten mixture are in a reactor in the presence of a catalyst component at a temperature ranging from 190° C. to 240° C.

In a subsequent step (c), the temperature of the molten mixture is raised, and the pressure is decreased to subatmospheric pressure, to form the ionomeric, modified PBT copolymer, comprising polyester units selected from the following formulas (1), (2), (3), (4), (5), (6), (7), (8), and (9):

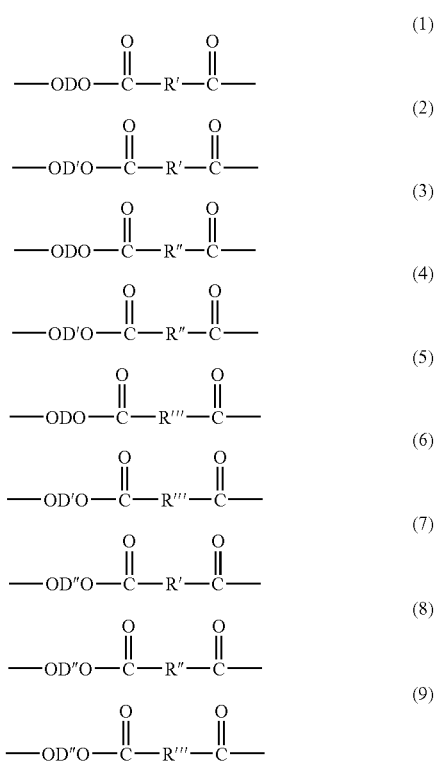

wherein D is 1,4-butylene (—($C_4H_8$)—); D' is ethylene (—($C_2H_4$)—); D''' is 1,2-tripropylene, 1,3-tripropylene, or a combination thereof, R' is terephthalylene (-1,4-($C_6H_4$)—); R'' is isophthalylene (-1,3-($C_6H_4$)—); and R''' is the decarboxylated residue of the aromatic dicarboxylic acid containing an inorganic ionic group. In one embodiment, R''' has the formula:

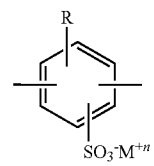

wherein R is hydrogen, halogen, $C_{1-8}$ alkyl or $C_{6-12}$ aryl; M is a metal, and n is 1 to 5, such that the ionomeric, modified poly(1,4-butylene terephthalate) copolymer comprises divalent ionomer units of the formula:

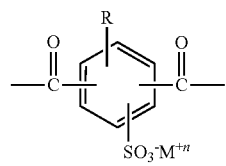

wherein R is hydrogen, halogen, $C_{1-8}$ is alkyl or $C_{6-12}$ aryl; M is a metal, and n is 1 to 5.

In the three-step embodiment, the aromatic dicarboxylic acid containing an inorganic ionic group can be added to the reactor prior to the addition of the 1,4-butanediol; during addition of the 1,4-butanediol; or to the second molten mixture. The aromatic dicarboxylic acid or a chemical equivalent thereof containing an inorganic ionic group is added in a molar amount that is in at least 1.2 times molar excess relative to the molar amount of ionic aromatic dicarboxylic acid or a chemical equivalent thereof incorporated into the ionomeric, modified PBT copolymer.

It will be appreciated that the components in the first and second molten mixtures can vary, depending on the diol used in step (a). When the PET component is depolymerized with ethylene glycol, the first molten mixture contains oligomers containing ethylene terephthalate moieties, oligomers containing ethylene isophthalate moieties, oligomers containing diethylene terephthalate moieties, oligomers containing diethylene isophthalate moieties, covalently bonded oligomeric moieties containing at least two of the foregoing moieties, ethylene glycol, and combinations thereof. When the PET component is depolymerized with propylene glycol, the first molten mixture contains oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, propylene glycol and combinations thereof. The propylene glycol can be either 1,3- or 1,2-propylene glycol, or a combination thereof.

The diol component (ethylene glycol, propylene glycol, and combinations thereof) can be present in step (a) of this embodiment in a molar amount that is at least 25%, or alternatively at least 50% of the amount of ethylene glycol moieties present in the PET component.

The compounds used in the process can be reused and/or collected as the process proceeds. In one embodiment, the ethylene glycol, propylene glycol, or combination thereof and the 1,4-butanediol are removed and collected in a vessel in step (b). In another embodiment, in step (b), 1,4-butanediol is refluxed back into the reactor and excess 1,4-butanediol, ethylene glycol, propylene glycol, tetrahydrofuran, or combinations thereof is removed. The duration of step (b) can also vary. Step (b) is conducted for a sufficient period of time to reduce at least 65% of ethylene glycol from the second molten mixture. In one embodiment, step (b) lasts at least 45 minutes. The pressure at which step (b) is carried out can vary. In one embodiment, step (b) is carried out in atmospheric conditions. In another embodiment, step (b) is carried out in subatmospheric conditions. Different combinations are possible. In one embodiment, step (b) is carried out with excess 1,4-butanediol and at a pressure from 300 to 1500 mbar absolute. The 1,4-butanediol used during step (b) can be added in a molar amount that is in excess, e.g., at least 1.1 times molar excess, relative to the molar amount of 1,4-butanediol moieties incorporated into the ionomeric, modified PBT copolymer obtained in step (c). In another embodiment, 1,4-butanediol is used in a molar excess amount from 1.1 to 5.

Step (c) can also be carried out with modifications, depending on the application. In one embodiment, for instance, a component selected from the group of excess 1,4-butanediol, ethylene glycol, propylene glycol, tetrahydrofuran, or a combination thereof is removed during step (c). The pressure at which step (c) is carried out can also vary. In one embodiment, step (c) is carried out at a pressure that is less than 10 mbar.

The three-step process can be carried out in the same reactor. Alternatively, the three-step process can be carried out in at least two reactors.

This three-step process can optionally include the step of adding a basic compound as described above during step (a), step (b), step (c), or a combination thereof, to thereby further reduce THF production. Alternatively, difunctional epoxy compounds can optionally be added during step (b) in the amounts indicated above. Advantageously the three-step process can reduce the amount of THF by at least 30% as compared to the amount of tetrahydrofuran produced by the two-step process that depolymerizes the PET component with 1,4-butanediol instead of ethylene glycol, propylene glycol, or a combination thereof.

A solid-state polymerization step can optionally be used. The solid-state polymerization generally involves subjecting the ionomeric, modified PBT copolymer formed from the molten mixture to an inert atmosphere or subatmospheric pressure and heating to a temperature for a sufficient period of time to build the molecular weight of the PBT. Generally, the temperature to which the ionomeric, modified PBT copolymer is heated is below the melting point of the ionomeric, modified PBT copolymer, e.g., from 5 to 60° C. below the melting point of the ionomeric, modified PBT copolymer. In one embodiment, such a temperature may range from 150 to 210° C. Suitable periods of time during which the solid-state polymerization occurs may range from 2 to 20 hours, depending on the reaction components, conditions, and equipment used. The solid-state polymerization is generally carried out under tumultuous conditions sufficient to promote further polymerization of the ionomeric, modified PBT copolymer to a suitable molecular weight. Such tumultuous conditions may be created by subjecting the ionomeric, modified PBT copolymer to tumbling, the pumping of inert gas into the system to promote fluidization of polymer particle, e.g., pellets, chips, flakes, powder, and the like. The solid-state polymerization can be carried out at atmospheric pressure and/or under reduced pressure, e.g. from 1 atmosphere to 1 mbar.

The ionomeric, modified PBT copolymer manufactured by either of the above methods includes (a) polyester units comprising non-ionomeric ester units and ionomeric ester units substituted with an inorganic ionic group; and (b) polyester units having at least one residue that is derived from a PET component.

In one embodiment, the ionomeric, modified PBT copolymer produced by the above processes is a random copolymer. In another embodiment, it is a non-random copolymer. In the ionomeric, modified PBT copolymer produced by the above processes, the polyester units comprising non-ionomeric ester units and ionomeric ester units substituted with an inorganic ionic group (a) are of formula (10)

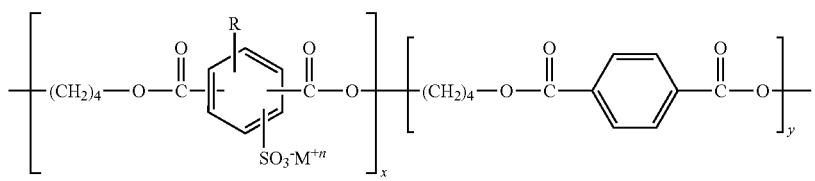

wherein R is hydrogen, halogen, $C_{1-4}$ alkyl, or $C_{6-12}$ aryl; M is a metal, n is 1 to 5, and x and y represent the number of ionomeric and non-ionomeric units in the copolymer, respectively. In one embodiment, R is hydrogen.

In particular, M is a metal counterion, and it is to be understood that where the valence of M exceeds 1, M may be associated with more than one ionic group. Exemplary counterions M include alkaline or alkaline earth metals where n=1-2, particularly sodium, lithium, potassium, zinc, tin, aluminum, copper, manganese, nickel, cobalt, iron, chromium, and other transition metal cations. In particular, the metal counterion is sodium ion. In addition, ammonium salts represented by the general formula $NH_xR_y^+$ (wherein R is a $C_{1-6}$ alkyl group and the sum of x and y is 4) can also be used.

The ionomer units, x, are present in the copolymer in an amount from 0.05-5 mole percent, based on the total moles of ester units in the polymer, particularly 0.1 to 5 mole percent. The ratio of x to y can vary widely, depending on the desired properties of the PBT copolymer, the number of polyester units derived from the PET component, and the like.

In a specific embodiment, the ionomeric, modified PBT copolymer comprises structural units with at least 0.05 mole % sodium sulfonate salt groups based on the total number of ester repeat units. In this embodiment, the polyester units comprising non-ionomeric ester units and ionomeric ester units substituted with an inorganic ionic group (a) are of formula (11)

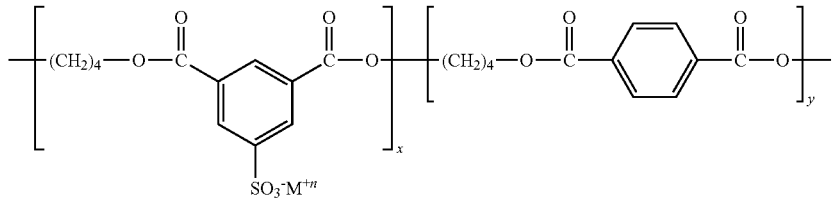

wherein y represents the number of non-ionomeric units in the copolymer, and x represents the number of ionomeric units in the copolymer.

The ionomeric, modified PBT copolymer further comprises polyester units (b) having at least one residue that is derived from a PET component. The residue derived from the PET component can be selected from the group consisting of ethylene glycol residues, diethylene glycol residues, isophthalic acid residues, antimony-containing compounds, germanium-containing compounds, titanium-containing compounds, cobalt-containing compounds, tin-containing compounds, aluminum-containing compounds, aluminum, aluminum salts, 1,3-cyclohexane dimethanol isomers, 1,4-cyclohexane dimethanol isomers (including cis-1,3-cyclohexane dimethanol, cis-1,4-cyclohexane dimethanol, trans-1,3-cyclohexane dimethanol, and trans-1,4-cyclohexane dimethanol), alkali salts, alkaline earth metal salts, including calcium, magnesium, sodium and potassium salts, phosphorous-containing compounds and anions, sulfur-containing compounds and anions, naphthalene dicarboxylic acids, and combinations thereof.

Depending on factors such as whether polyethylene terephthalate or polyethylene terephthalate copolymers are used, the residue can include various combinations. In one embodiment, for instance, the residue includes mixtures of ethylene glycol and diethylene glycol. In another embodiment, the residue includes mixtures of ethylene glycol and diethylene glycol and isophthalic acid. In another embodiment, the residue derived from polyethylene terephthalate further includes cis-1,3-cyclohexane dimethanol, the cis isomer of 1,4-cyclohexane dimethanol, the trans isomer of 1,3-cyclohexane dimethanol, the trans isomer of 1,4-cyclohexane dimethanol, and combinations thereof. In another embodiment, the residue includes cis-1,3-cyclohexane dimethanol, cis-1,4-cyclohexane dimethanol, trans-1,3-cyclohexane dimethanol, trans-1,4-cyclohexane dimethanol, and combinations thereof. And in another embodiment, the residue can be a mixture of ethylene glycol, diethylene glycol, isophthalic acid residues, the cis isomer of a cyclohexane dimethanol, the trans isomer of a cyclohexane dimethanol, and combinations thereof. In one embodiment, the residue derived from polyethylene terephthalate includes mixtures of ethylene glycol, diethylene glycol, and cobalt-containing compounds. Such cobalt-containing compound mixture can also contain isophthalic acid residues.

The amount of the ethylene glycol groups (i.e., residues), diethylene glycol groups, and the isophthalic groups in the polymeric backbone of the ionomeric, modified PBT copolymer can vary, and can contain, for example, isophthalic acid groups in an amount that is at least 0.1 mole %, specifically from 0 or 0.1 to 10 mole % (0 or 0.07 to 7 wt. %). The ionomeric, modified PBT copolymer can contain ethylene glycol in an amount that is at least 0.1 mole % and can range from 0.1 to 10 mole % (0.02 to 2 wt. %), specifically. In one another embodiment, the ionomeric, modified PBT copolymer has an ethylene glycol content that is more than 0.85 wt. %, or alternatively 0.1 to 2 wt. %. The ionomeric, modified PBT copolymer can also contain diethylene glycol in an amount from 0.1 to 10 mole % (0.04 to 4 wt. %). The amount of the butanediol groups is generally about 98 mole % and can vary from 95 to 99.8 mole % in some embodiments. The amount of the terephthalic acid groups is generally about 98 mole % and can vary from 90 to 99.9 mole % in some embodiments.

Unless otherwise specified, all molar amounts of the isophthalic acid groups and/or terephthalic acid groups are based on the total moles of diacids/diesters in the composition. Unless otherwise specified, all molar amounts of the butanediol, ethylene glycol, and diethylene glycol groups are based on the total moles of diol in the composition. The weight percent measurements stated above are based on the way terephthalic acid groups, isophthalic acid groups, ethylene glycol groups, and diethylene glycol groups have been defined herein.

The total amount of the polyethylene terephthalate residue in the ionic, modified PBT copolymer can vary. For instance, the total amount of the residue can be from 1.8 to 2.5 wt. %, or from 0.5 to 2 wt. %, or from 1 to 4 wt. %. The ethylene glycol, diethylene glycol, and cyclohexanedimethanol groups can be individually or in combination present in an amount from 0.1 to 10 mole %, based on 100 mole % of glycol of the ionomeric, modified PBT copolymer. The isophthalic acid groups can be present in an amount from 0.1 to 10 mole %, based on 100 mole % of diacid/diester in the ionomeric, modified PBT copolymer.

When it is desirable to make an ionomeric, modified PBT copolymer having a melting temperature Tm that is at least 200° C., the total amount of diethylene glycol, ethylene glycol, and isophthalic acid groups should be within a certain range. As such, in one embodiment, the total amount of the diethylene glycol, ethylene glycol, and isophthalic acid groups in the ionomeric, modified PBT copolymer is more than 0 and less than or equal to 23 equivalents, relative to the total of 100 equivalents of diol and 100 equivalents of diacid groups in the ionomeric, ionomeric, modified PBT copolymer. In another embodiment, the total amount of the isophthalic acid groups, ethylene glycol groups, and diethylene glycol groups is from 3 to less than or equal to 23 equivalents, relative to the total of 100 equivalents of diol and 100 equivalents of diacid groups in the modified PBT copolymer. In another embodiment, the total amount of the isophthalic acid groups, ethylene glycol groups, and diethylene glycol groups is from 3 to less than or equal to 10 equivalents, relative to the total of 100 equivalents of diol and 100 equivalents of diacid groups in the modified PBT copolymer. In another embodiment, the total amount of the isophthalic acid groups, ethylene glycol groups, and diethylene glycol groups is from 10 to less than or equal to 23 equivalents, relative to the total of 100 equivalents of diol and 100 equivalents of diacid groups in the modified PBT copolymer. In one embodiment, diethylene glycol, ethylene glycol, and/or isophthalic acid can be added during the process.

The total ethylene glycol groups, isophthalic acid groups, and diethylene glycol groups can vary, depending on the application needs. In one embodiment, the composition can have total monomer content selected from the group consisting of ethylene glycol, isophthalic acid groups, and diethylene glycol groups in an amount from more than 0 and less than or equal to 17 equivalents relative to the total of 100 equivalents of diol and 100 equivalents of diacid groups in the modified PBT copolymer. Advantageously, such compositions can maintain useful properties, such as heat deflection temperatures that are more than 80° C.

The total amount of inorganic residues derived from the PET component can be present in amounts from more than 0 parts per million (ppm), up to 1000 ppm, based on parts by weight of the ionomeric, modified PBT copolymer. Examples of such inorganic residues include of antimony-containing compounds, germanium-containing compounds, titanium-containing compounds, cobalt-containing compounds, tin containing compounds, aluminum-containing compounds, aluminum, aluminum salts, alkaline earth metal salts, alkali salts, including calcium, magnesium, sodium and potassium salts, phosphorous-containing compounds and anions, sulfur-containing compounds and anions, and combinations thereof. In another embodiment, the amounts of inorganic residues can be from 250 to 1000 ppm, specifically from 500 to 1000 ppm.

The physical properties of the ionomeric, modified PBT copolymer can vary, depending on factors such as the performance properties that are required, the equipment used, process parameters, and the like. The molecular weight of the ionomeric, modified PBT copolymer can be generally at least 3,000 g/mol, specifically from 10,000 to 40,000 g/mol, more specifically from 15,000 to 30,000 g/mol.

The intrinsic viscosity (IV) can be at least 0.4 dL/g, specifically from 0.5 to 1.3 dL/g, more specifically from 0.4 to 1 dL/g. All intrinsic viscosities in this application refer to those viscosities measured in a solution of 60 wt. % phenol and 40 wt. % 1,1,2,2-tetrachloroethane at 25° C.

The melting point (Tm) of the ionomeric, modified PBT copolymer can be least 200° C., at least 205° C., or at least 210° C. In another embodiment, the melting point ranges from 200° C. or from 210° C. to 218° C. or 220° C.

The flexural modulus of the PET-derived modified PBT can be at least 1000 MPa, specifically from 1000 MPa to 5000 MPa, more specifically from 2400 to 2500 MPa. The tensile strength (at yield) of the PET-derived modified PBT can be at least 30 MPa, specifically from 30 MPa to 100 MPa. The tensile elongation (at yield) of the ionomeric, modified PBT copolymer is at least 2%.

In another embodiment, the tensile elongation (yield, break) can be from 2% to 10%. The heat deflection temperature can be from at least 45° C. or 60° C., specifically from 45° C. to 65° C. or 75° C. at 1.82 MPa for 3.2 mm bars.

The notched Izod strength temperature of the ionomeric, modified PBT copolymer can be at least 20 J/m, specifically from 20 J/m to 60 J/m, more specifically from 27 to 45 J/m.

The ionomeric, modified PBT copolymer can be used alone, e.g., as a molding composition, or in combination with a wide variety of other thermoplastic polymers, for example other polyesters, polyolefins (e.g., polyethylenes and polypropylenes), polycarbonates (e.g., polycarbonates derived from bisphenol A), polyimides, polyetherimides, polyamides, and the like.

In one embodiment, the ionomeric, modified PBT copolymer is used in combination with a polyester, e.g., polyethylene terephtalate, poly(1,4-cyclohexylenedimethylene 1,4-cyclohexanedicarboxylate), poly(1,4-cyclohexylenedimethylene terephthalate), poly(1,4-butylene-co-1,4-but-2-ene diol terephthalate), and/or poly(cyclohexylenedimethylene-co-ethylene terephthalate). The PBT copolymer can be used in combination with virgin poly(1,4-butylene terephthalate) or non-ionomeric, modified polybutylene terephthalate copolymers containing residues derived from a PET component.

In one embodiment, the ionomeric, modified PBT copolymer is used in combination with a polyamide. Suitable polyamide resins are a generic family of resins known as Nylons, characterized by the presence of an amide group (—C(O)NH—). Nylon-6 and Nylon-6,6 are the generally used polyamides and are available from a variety of commercial sources. Other polyamides, however, such as Nylon-4,6, Nylon-12, Nylon-6,10, Nylon-6,9, Nylon-6/6T and Nylon-6,6/6T with triamine contents below 0.5 wt. %, as well as others, such as the amorphous nylons, may be useful for particular applications. A specific polyamide is Nylon-6,6. Nylon-6, for example, is a polymerization product of caprolactam. Nylon- 6,6 is a condensation product of adipic acid and 1,6-diaminohexane. Likewise, Nylon-4,6 is a condensation product of adipic acid and 1,4-diaminobutane. Besides adipic acid, other useful diacids for the preparation of Nylons include azelaic acid, sebacic acid, dodecane diacid, as well as terephthalic and isophthalic acids, and the like. Other useful diamines include m-xylyene diamine, di-(4-aminophenyl)methane, di-(4-aminocyclohexyl)methane, 2,2-di-(4-aminophenyl)propane, 2,2-di-(4-aminocyclohexyl)propane, among others. Copolymers of caprolactam with diacids and diamines are also useful. Polyamides that are themselves the product of a recycle process can be used.

The amount of the modified PBT copolymer in any given thermoplastic composition varies with the specific application. Generally, the modified PBT copolymer functions as the polyester component of the composition, and accordingly can be present in amounts that comprises more than 0, up to 99 wt. %, specifically from 1 to 95 wt. %, more specifically from to 5 to 90 wt. %, even more specifically from 10 to 80 wt. %, still more specifically from 20 to 70 wt. %, or from 30 to 60 wt. %, each based on of the total weight of the thermoplastic composition, with the remainder of the composition being other polymer(s) and any optional additives as described below.

Thermoplastic compositions comprising the ionomeric, modified PBT copolymer and a polyamide can comprise from 2 to 98 wt. % of the ionomeric, modified PBT copolymer, 2 to 98 wt. % of polyamide, and 0 to 10 wt. % of a colorant; specifically, from to 5 to 90 wt. % of the ionomeric, modified PBT copolymer, 10 to 99 wt. % of polyamide, and 0.01 to 10 wt. % of a colorant; more specifically from 10 to 80 wt. %, ionomeric, modified PBT copolymer, 20 to 90 wt. % of polyamide, and 0.1 to 10 wt. % of a colorant; and still more specifically from 20 to 70 wt. % of the ionomeric, modified PBT copolymer, 30 to 80 wt. % of polyamide, and 0.1 to 8 wt. % of a colorant. Each of the foregoing amounts is based on the total weight of the composition.

Colorants are known in the art, and include, for example, inorganic cationic dyes, organic cationic dyes, inorganic or organic pigments, or combinations thereof. Any number of different colorants may be used, in any proportions, although it will be understood by those skilled in the art that the total loading of colorants in the polymer matrix, and the number of different colorants used, will be kept to a minimum commensurate with obtaining the color required. Exemplary colorants include pigments such as metal oxides, mixed metal oxides, sulfides, aluminates, sodium sulfo-silicates, sulfates and chromates, for example carbon blacks, zinc oxide, titanium dioxides, zinc sulfides, zinc ferrites, iron oxides, ultramarine blue, Pigment Brown 24, Pigment Red 101, and Pigment Yellow 119; and organic pigments and dyes such as, azos, di-azos, quinacridones, perylenes, naphthalene tetracarboxylic acids, flavanthrones, isoindolinones, tetrachloroisoindolinones, anthraquinones, anthanthrones, dioxazines, phthalocyanines, and azo lakes, for example Pigment Blue 60, Pigment Red 122, Pigment Red 149, Pigment Red 177, Pigment Red 179, Pigment Red 202, Pigment Violet 29, Pigment Blue 15, Pigment Green 7, Pigment Yellow 147 and Pigment Yellow 150.

Thermoplastic compositions comprising the ionomeric, modified PBT copolymer can optionally further comprise other conventional additives used in polyester polymer compositions such as non-reinforcing fillers, stabilizers such as antioxidants, thermal stabilizers, radiation stabilizers, and ultraviolet light absorbing additives, mold release agents, plasticizers, quenchers, lubricants, antistatic agents and processing aids. Other ingredients, such as dyes, pigments, laser marking additives, and the like can be added for their conventionally employed purposes. A combination comprising one or more of the foregoing or other additives can be used. The total amount of the foregoing additives (with the exception of filler) is 0.1 to 5 wt. % of the total weight of the thermoplastic composition.

Thermoplastic compositions comprising the ionomeric, modified PBT copolymer (and other optional polymer(s) and additive(s)) can be produced as is known in the art. The compositions are generally made by combining suitable amounts of components by melt blending, for example in an extruder. The components may be compounded simultaneously, separately, or in combinations containing two or three of the components. Various of the components can be added in the form of a masterbatch. The extrusion process can include one or more passes through an extruder.

The thermoplastic compositions can be formed, shaped or molded into articles using common thermoplastic processes such as film and sheet extrusion, molding, and the like. In one embodiment, the components are pre-compounded, pelletized, and then molded. Pre-compounding can be carried out in conventional equipment. For example, after pre-drying the polymer components (e.g., for four hours at 120° C.), a single screw extruder may be fed with a dry blend of the ingredients, the screw employed having a long transition section to ensure proper melting. Alternatively, a twin screw extruder with intermeshing co-rotating screws can be fed with resin and additives at the feed port and reinforcing additives (and other additives) may be fed downstream. In either case, a generally suitable melt temperature will be 230° C. to 300° C. The pre-compounded composition can be extruded and cut up into molding compounds such as conventional granules, pellets, and the like by standard techniques. The composition can then be molded in any equipment conventionally used for thermoplastic compositions, such as a Newbury type injection molding machine with conventional cylinder temperatures, at 230° C. to 280° C., and conventional mold temperatures at 55° C. to 95° C.

Different molding techniques can be used, for example injection molding, gas-assist injection molding, extrusion molding, compression molding, blow molding, and the like. Injection molding is a process wherein an amount of polymer several times that necessary to produce an article is heated in a heating chamber to a viscous liquid and then injected under pressure into a mold cavity.

In an advantageous feature, molded articles comprising the ionomeric, modified PBT copolymer and a polyamide are essentially free from delamination. Delamination is the visually observed separation of a surface layer showing a flaking or onion skin effect. "Essentially free from delamination" is defined as showing no delamination by visual inspection. In one embodiment, the specimen used for inspection is a molded bar. "Visual inspection" is determined by unaided vision (e.g., 20/20 vision in the absence of any magnifying device with the exception of corrective lenses necessary for normal eyesight) at a distance of one half (½) meter.

A molded article comprising the composition can have good impact properties, for example, an unnotched Izod impact strength from to 20 to 50 KJ/m2, measured at 23° C. in accordance with ISO 180.

A molded article comprising the composition can have a heat deflection temperature from 175 to 225° C., measured in accordance with ISO 75 at 1.8 MPa.

The composition can further have good tensile properties. A molded article comprising the composition can have a tensile modulus of elasticity from 8.0 to 10.0 GPa, or from 8.0 to 15 GPa, measured in accordance with ISO 527. A molded article comprising the composition can have an elongation at break from 1 to 3%, measured in accordance with ISO 527. A molded article comprising the composition can have a tensile strength at yield from to 90 to 120 MPa, measured in accordance with ISO 527.

The compositions are also heat stable. For example, the compositions maintain at least 80% of their initial weight average molecular weight after molding at 265° C., 275° C., or 285° C. Alternatively, or in addition, the compositions can have a polydispersity index after molding at 265° C., 275° C., or 285° C. that is from 80% to 120% of the polydispersity index of the composition prior to molding.

Advantageously, a molding composition containing the ionomeric, modified PBT copolymers can have a reduced $CO_2$ emissions index. The reduced $CO_2$ emissions index, as defined in this application, is the amount of $CO_2$, expressed in kg, that is saved when one (1) kg of a composition containing the ionomeric, modified PBT copolymers is made, as compared to the amount of $CO_2$, expressed in kg, that is created when the composition is made with polybutylene terephthalate that is derived from monomers. Generally, our compositions generally have a reduced $CO_2$ emissions index that is more than approximately 0.06 kg, and can range from 0.06 kg to 2.25 kg.

In an especially advantageous feature, it has been found that thermoplastic compositions comprising the ionomeric, modified PBT copolymer and a polyamide are useful in the manufacture of fibers, for example fibers used in carpets. Such fibers often contain a colorant.

Colorants may be added to the thermoplastic composition in a variety of ways, for example direct additions of the colorant(s) to the polymers, addition of the single pigment dispersions (i.e., addition of each colorant as a separate concentrate in a carrier resin), and addition of multiple colorant dispersions (i.e., addition of a single concentrate of mixed colorants, providing the desired color or let down into the polymer composition, in a carrier resin). The addition method may be carried out in a single compounding step prior to fiber formation, or may be carried out on the melt.

In one embodiment, the ionomers are incorporated into the polyamide either during a melt-compounding step prior to fiber spinning, or during the fiber spinning process itself. Alternatively, the polyester ionomers are first combined with the colorant, or mixture or colorants, to form a color concentrate that is then incorporated into the polyamide during a melt-compounding step or during the fiber drawing or spinning process.

Use of the ionomeric, modified PBT copolymer as a precompounded color concentrate can provide further improvement to the fiber color. Thus, in a specific embodiment, a colorant is first melt processed with a ionomeric, modified PBT copolymer\ to form a color concentrate. The color concentrate can be made using a single colorant, often called a single pigment dispersion, or a mixture of colorants. In one embodiment, the color concentrate contains from about 5-70 wt. % colorant. Other compatible resins can also be added during the preparation of the color concentrate, including fiber-forming polyamides or polyesters. The color concentrate can be melt processed in a number of ways known to those skilled in the art, for example via extrusion on a single or twin screw extruder.

The color concentrate or several different color concentrates can then be combined with the polyamide (and optional additional ionomeric, modified PBT copolymer) in a melt process to form a colored filament that is drawn into a fiber, e.g., by melt spinning. In one embodiment the color concentrate addition is carried out on the melt-spinning apparatus itself at any stage of the fiber forming process, for example at the extruder throat, at any addition port on the extruder barrel, at the melt pump, or at the spinneret chamber. In another embodiment, the color concentrate is combined with the fiber forming base resin prior to introduction to the melt spinning apparatus. When more than one color concentrate (single pigment dispersion) is used, more than one addition point can is used for the addition of the color concentrate.

The fibers comprising the ionomeric, modified PBT copolymer and a polyamide have a very fine phase separate morphology. The phase separation allows the matrix resin to maintain its desirable mechanical properties. However, given the phase separation between the matrix resin and the ionomeric, modified PBT copolymer the improved, uniform color of the resultant fiber is especially surprising.

The fibers produced may be of a range of deniers per filament (dpf) depending on the ultimate use to which such fibers may be put, i.e., low dpf for textile use, higher dpf for use in carpets. The cross-sectional shape of the fibers can also be any of a wide range of possible shapes, including round, delta, trilobal, tetralobal, grooved, or irregular. These product fibers can be subjected to any of the known downstream processes normally carried out on melt-spun fibers, including crimping, bulking, twisting etc., to produce yarns suitable for incorporation into a variety of articles of manufacture, such as apparel, threads, textiles, upholstery and carpets.

The fibers can be used in the preparation of articles having improved color strength in various forms, including any of a cloth, flocked cloth, fabric, woven fabric, pile fabric, knitted fabric, filaments, floor-cover, textile, fiber, rug, yarn, carpet, and the like.

The invention is further illustrated by the following non-limiting examples. In the following formulations, the amount of each component is in weight percent, based on the total weight of the composition.

EXAMPLES

Example 1

Pilot Plant Process (BDO:(PET+DMSIP)=3:1)

A modified, ionomeric PBT copolymer was derived from a PET component in a helicone reactor using the two-step process described above. The helicone reactor had a capacity of 40 liters and was equipped with a special design of twin opposing helical blades with 270 degree twist; constructed of 316 SS with 16 g polish finish. The blade speed could be varied from 1 to 65 revolutions per minute (rpm). The agitators were connected to a 7.5 HP Constant Torque Inverter Duty Motor, which operates at 230/460 VAC, 3 PH and 60 Hz. These agitators provided excellent surface area for the polymer melt in order to build molecular weight. The helicone was also designed with an overhead condenser to condense the vapors in the glycolysis, transesterification (if any) and polymerization stages.

In step (a) 25 lbs (11.3 kg) of recycle PET flakes, 2.16 lbs (0.98 kg) of dimethyl sulfonated isophthalate (DMSIP), and 35 lbs (15.9 kg) of 1,4-butanediol (BDO) (molar ratio of BDO:(PET+DMSIP)=3:1) were charged to the helicone reactor. Next, 5.86 ml (140 ppm as Ti) of tetraisopropyl titanate (TPT) catalyst was also added to the reaction mixture. The temperature of the heating oil for the helicone was set to 250° C. The agitator speed was set at 67% of maximum. The BDO was refluxed into the reactor for 2 hours at 227° C. The design of the overhead condenser system did not allow a complete reflux of the BDO. As a result, about 5 to 10 lbs (2.3-4.5 kg) of BDO that evolved in the initial stages of the depolymerization/reaction could not be refluxed. The butanediol evolved after that could be completely refluxed into the reactor.

In step (b) (the polymerization stage), a vacuum was applied to the helicone reactor and the reflux of BDO to the reactor was discontinued. The speed of the agitator was set to 60% of max and the target amps of the motor were 3.5 amps. The logic for changes in agitator speed as the molecular weight of the polymer built up is shown in Table 1.

TABLE 1

| Stage | Build | Agitator Speed | Target Amp | RPM |
|---|---|---|---|---|
| Ester Interchange | N/A | 66.7% | N/A | 34 |
| Polymerization | 1st | 60% | 3.5 | 32 |
|  | 2nd | 30% | 3.8 | 16 |
|  | 3rd | 18% | 4.5 | 9 |

The system pressure was brought down to 0.5 torr (0.066 kPa) by the vacuum blower. The reaction was carried out until the polymer mass reached its third build. The reaction was stopped after 15 minutes into the third build and the polymer was cast in blobs. The ionomeric, modified PBT copolymer product was allowed to dry, and then ground into pellets. IV measurement, NMR analysis and DSC analysis were conducted on the sample.

Example 2

Pilot Plant Process (BDO:(PET+DMSIP)=3:1)

A procedure similar to that described in Example 1 was followed for Example 2, using pilot plant scale equipment, rather than the Helicone reactor. A higher catalyst loading of 17.58 ml (434 ppm as Ti) was used.

The resulting properties of the ionomeric, modified PBT copolymer synthesized in Examples 1 and 2 are shown in Table 2, together with comparable data from a commercial, virgin PBT sample.

TABLE 2

| Data | Parameter | Unit | Comparative Ex. A | Ex. 1 | Ex. 2 |
|---|---|---|---|---|---|
| DSC Data | Melting Point | (° C.) | 222.6 | 164.3 | 202.5 |
|  | Crystallization | (° C.) | 168.3 | — | 130.8 |

TABLE 2-continued

| Data | Parameter | Unit | Comparative Ex. A | Ex. 1 | Ex. 2 |
|---|---|---|---|---|---|
|  | Temp DH fusion | (kJ/kg) | 38.4 | 14.9 | 27.7 |
|  | DH crystallization | (kJ/kg) | 39.9 | — | 27.9 |
| Intrinsic Viscosity | IV | dl/g | 1.2 | 0.3-0.7 | 0.3-0.7 |
| Composition by ¹H NMR analysis | EG Repeat Unit | mol % | 0 | 9.73 | 2.76 |
|  | DEG Repeat Unit | mol % | 0 | 4.27 | 1.06 |
|  | BDO Repeat Unit | mol % | 50 | 37.44 | 47.01 |
|  | Isophthalic Repeat Unit | mol % | 0 | 1.07 | 1.06 |
|  | Terephthalic Repeat Unit | mol % | 50 | 45.21 | 45.82 |
|  | Ionomeric Repeat Unit | mol % | 0 | 2.28 | 2.29 |

Example 3-5 and Comparative Examples B-D

Materials

In the following Examples 3-5 and Comparative Examples B-D, Nylon 6,6 from Monsanto, high IV PET from Invista, the PET-derived ionomeric PBT copolymer described in Example 2, and non-ionomeric PET-derived (modified) PBT were used to generate the molding compositions of these Examples. Table 3 shows the composition of the individual components.

Methods

The components of the examples shown below in Table 3 were extruded on a 40 mm Werner Pfleiderer Twin Screw Extruder with a vacuum vented mixing screw, at a barrel and die head temperature between 240-265° C. and 150 to 300 rpm screw speed. The extruder has 8 independent feeders for different raws and can be operated at a maximum rate of 300 lbs/hr. The extrudate was cooled through a water bath prior to pelletizing. Test parts were injection molded on a van Dorn molding machine with a set temperature of approximately 240-265° C. The pellets were dried for 3-4 hours at 120° C. in a forced air-circulating oven prior to injection molding.

Testing Procedures

Tensile elongation at break was tested on 7×⅛ in. (177.8× 3.3 mm) injection molded bars at room temperature with a crosshead speed of 2 in./min (50.8 mm/min) for glass filled samples and 0.2 in/min (5.08 mm/min) for un-filled samples by using ASTM D648. Flexural properties were measured using ASTM 790 or ISO 178 method. A synopsis of all the relevant tests and test methods is given in Table 3.

TABLE 3

| Test | Test Standard | Default Specimen Type | Units |
|---|---|---|---|
| ASTM Flexural | ASTM D790 | Bar - 127 × 12.7 × 3.2 mm | MPa |
| ISO Flexural | ISO 178 | Multi-purpose ISO 3167 Type A | MPa |
| ASTM HDT | ASTM D648 | Bar - 127 × 12.7 × 3.2 mm | ° C. |
| ISO HDT | ISO 75 | Bar - 80 × 10 × 4 mm | ° C. |
| ASTM HDT | ASTM D648 | Bar - 127 × 12.7 × 3.2 mm | ° C. |

TABLE 3-continued

| Test | Test Standard | Default Specimen Type | Units |
|---|---|---|---|
| ISO HDT | ISO 75 | Multi-purpose ISO 3167 Type A | °C. |
| ASTM Filled Tensile | ASTM D638 | ASTM Type I Tensile bar | MPa |
| ISO Filled Tensile | ISO 527 | Multi-purpose ISO 3167 Type A | MPa |
| ISO Izod at Room Temperature | ISO 180 | Multi-purpose ISO 3167 Type A | $kJ/m^2$ |
| ASTM Notched Izod at Room Temperature | ASTM D256 | Bar* - 3 x ½ x ⅛ inch (76.2 x 12.7 x 3.2 mm) | J/m |
| ASTM Multiaxial Impact | ASTM D3763 | Disk - 101.6 mm diameter x 3.2 mm thick | J |
| ISO Charpy Impact | ISO 179 | Bar - 80 x 10 x 4 mm | $kJ/m^2$ |
| ISO Density | ISO 1183 | Bar - 80 x 10 x 4 mm | $g/cm^3$ |
| Shrinkage | — | Disk - 101.6 mm diameter x 3.2 mm thick | % |
| ISO Melt Volume Rate | ISO 1133 | Pellets | $cm^3/10$ min |
| ASTM Melt Flow Rate | ASTM D1238 | Pellets | g/10 min |
| ISO Vicat Softening Temp | ISO 306 | Bar - 80 x 10 x 4 mm | °C. |
| ISO Coefficient of Thermal Expansion | ISO 11359-2 | Multi-purpose ISO 3167 Type A | um/(m-°C.) |

Bars were notched prior to oven aging

The compositions and properties of the thermoplastic compositions are shown in Table 4.

TABLE 4

| Component | Unite | 1 | 2 | 3 | B | D |
|---|---|---|---|---|---|---|
| Ionomeric, modified PBT copolymer | % | 75 | 50 | 25 | — | — |
| Nylon 6,6 | % | 25 | 50 | 75 | 25 | 75 |
| Non-ionomeric modified PBT (0.66 IV) | % | — | — | — | 37.5 | 12.5 |
| Non-ionomeric modified PBT (1.2 IV) | % | — | — | — | 37.5 | 12.5 |

| Test | Unit | | | | | |
|---|---|---|---|---|---|---|
| Tensile Modulus (ASTM) | MPa | 3060.0 | 3120.0 | 3120.0 | 3160.0 | 4040.0 |
| Tensile Stress at Yield (ASTM) | MPa | 72.8 | 74.2 | 76.9 | 49.6 | 80.5 |
| Tensile Stress at Break (ASTM) | MPa | 54.5 | 73.7 | 75.1 | 49.6 | 80.5 |
| Tensile Elongation at Yield (ASTM) | % | 3.6 | 3.4 | 3.8 | 1.9 | 3.0 |
| Tensile Elongation at Break (ASTM) | % | 8.0 | 3.4 | 3.3 | 1.9 | 3.0 |
| Flexural Modulus (ASTM) | MPa | 2610.0 | 2640.0 | 2610.0 | 2810.0 | 3340.0 |
| Flexural Stress at Yield (ASTM) | MPa | 97.0 | 102.0 | 102.0 | 90.8 | 121.0 |
| Flexural Stress at Break (ASTM) | MPa | | | | 90.8 | 120.0 |
| Flexural Stress at 5% Strain (ASTM) | % | 96.3 | 100.0 | 99.8 | | 117.0 |
| Notched IZOD Impact Strength (ASTM), at 23°C. | J/m | 30.4 | 31.6 | 39.4 | 13.2 | 26.1 |

The data in Table 3 illustrates that properties similar to the non-ionomeric blend composition can be obtained using ionomeric, modified PBT copolymers. The data also shows that the notched Izod impact strength of the blends containing the ionomeric, modified PBT copolymers is better than that of the blends containing the non-ionomeric, modified PBT copolymers derived from a PET component.

Figure 2:
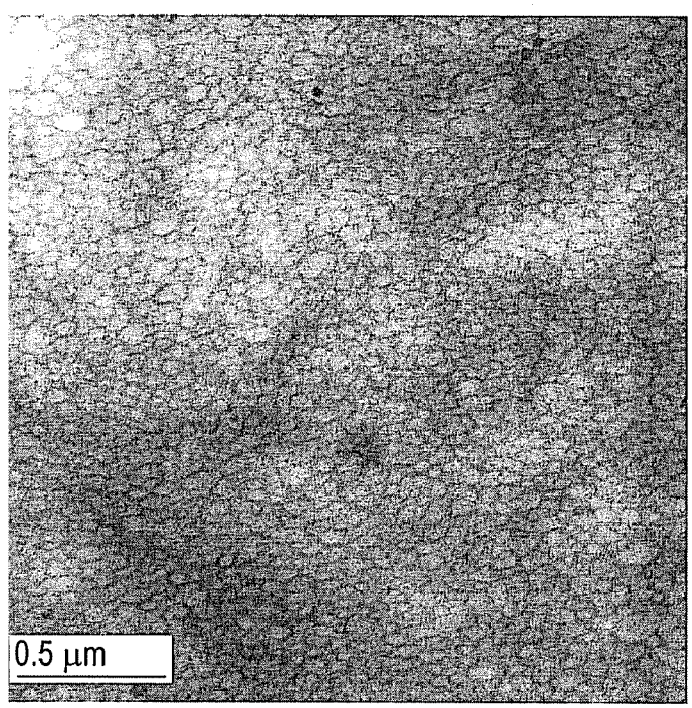
FIG. 2 is a TEM image of a molded sample of the composition of Example 4 (scale bar=0.5 micrometers).
Figure 3:
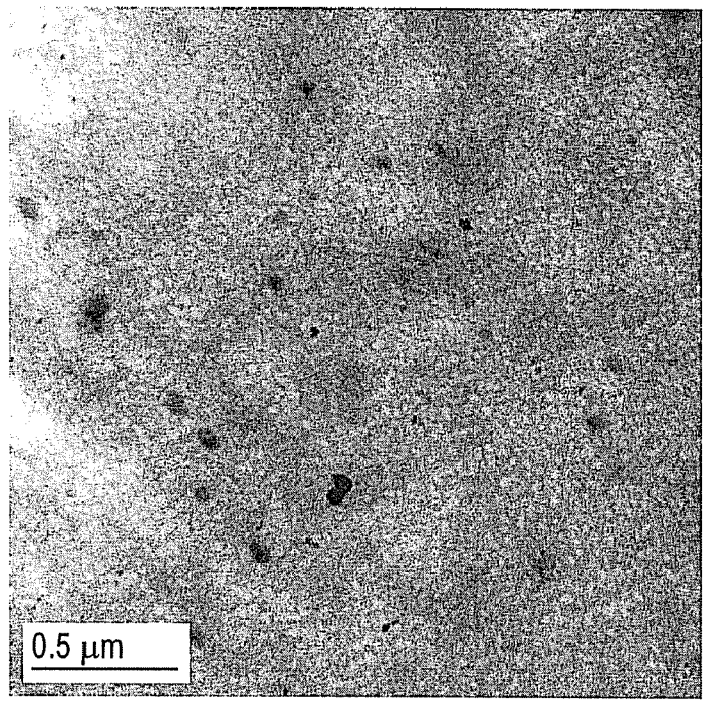
FIG. 3 is a TEM image of a molded sample of the composition of Example 5 (scale bar=0.5 micrometers).
Figure 4:
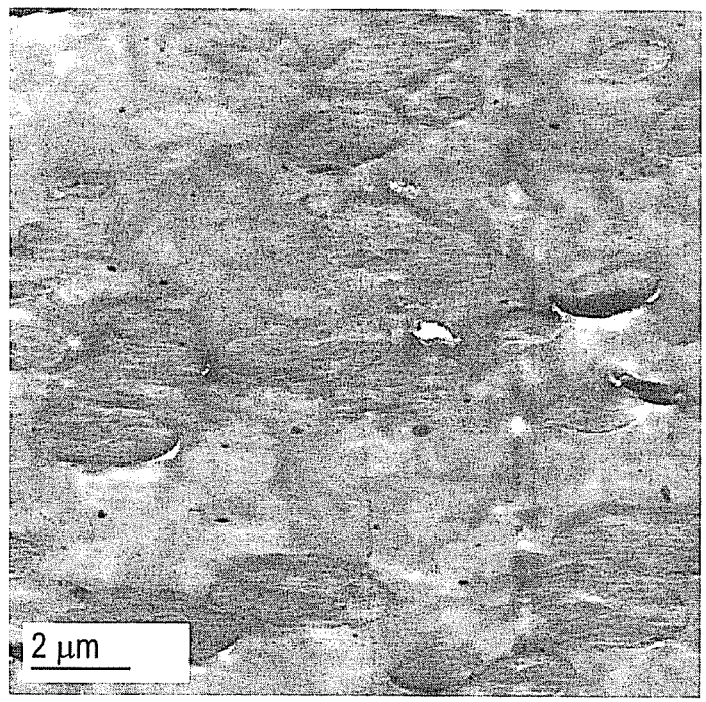
FIG. 4 is a TEM image of a molded sample of the composition of Comparative Example B (scale bar=2 micrometers).
Figure 5:
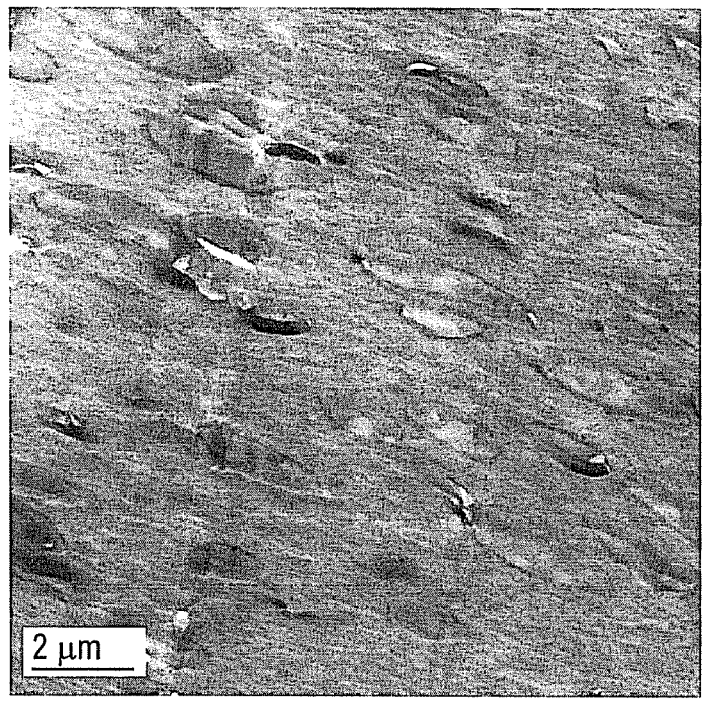
FIG. 5 is a TEM image of a molded sample of the composition of Comparative Example C (scale bar=2 micrometers).

Transmission electron micrographs were generated for the above set of Examples. Each of Examples 3, 4, and 5 (FIGS. 1-3) show compatible morphology, versus the Comparative Examples B and C (FIGS. 4-5). This indicates that the presence of the ionomeric moiety along the polymer backbone in the PET-derived ionomeric PBT leads to stable morphology in polyamide-based thermoplastic compositions.

PET-derived ionomeric PBT copolymers are accordingly compatible with polyamides such as Nylon 6,6. These blends offer useful engineering thermoplastic properties. Thirdly, a lesser amount of energy was needed to produce ionomeric PBT from PET, versus monomers such as dimethyl terephthalate. This energy refers to the non-renewable energy that is used in making the molding composition. It involves conducting a "cradle to grave" energy analysis on all components of the system and calculating the total energy required to make them. In all the examples shown, this difference in energy results only due to the use of the ionomeric, modified PBT copolymers versus DMT-based ionomeric PBT. All other ingredients components remain the same, and hence their energy contribution in the overall composition can be neglected.

Examples 6, 7, and 8

The formulations and the properties of these examples are shown in Table 5.

TABLE 5

| Component | Unit | 6 | 7 | 8 |
|---|---|---|---|---|
| Ionomeric modified PBT copolymer | % | 5 | 10 | 15 |
| Virgin PET (0.8 IV) | % | 95 | 90 | 85 |
| Property | Unit | | | |
| Tensile Modulus (ASTM) | MPa | 2660.0 | 2750.0 | 2730.0 |
| Tensile Stress at Yield (ASTM) | MPa | 63.0 | 60.7 | 60.2 |
| Tensile Stress at Break (ASTM) | MPa | | 59.3 | 60.1 |
| Tensile Elongation at Yield (ASTM) | % | 4.0 | 3.2 | 3.2 |
| Tensile Elongation at Break (ASTM) | % | — | 3.1 | 3.4 |
| Flexural Modulus (ASTM) | MPa | 2540.0 | 2500.0 | 2480.0 |

TABLE 5-continued

| Component | Unit | 6 | 7 | 8 |
|---|---|---|---|---|
| Flexural Stress at Yield (ASTM) | MPa | 89.0 | 86.0 | 84.3 |
| Flexural Stress at Break (ASTM) | MPa | | | |
| Flexural Stress at 5% Strain (ASTM) | % | 89.0 | 85.9 | 84.0 |
| Notched IZOD Impact Strength (ASTM), at 23° C. | J/m | 25.7 | 28.0 | 29.2 |

Figure 6:
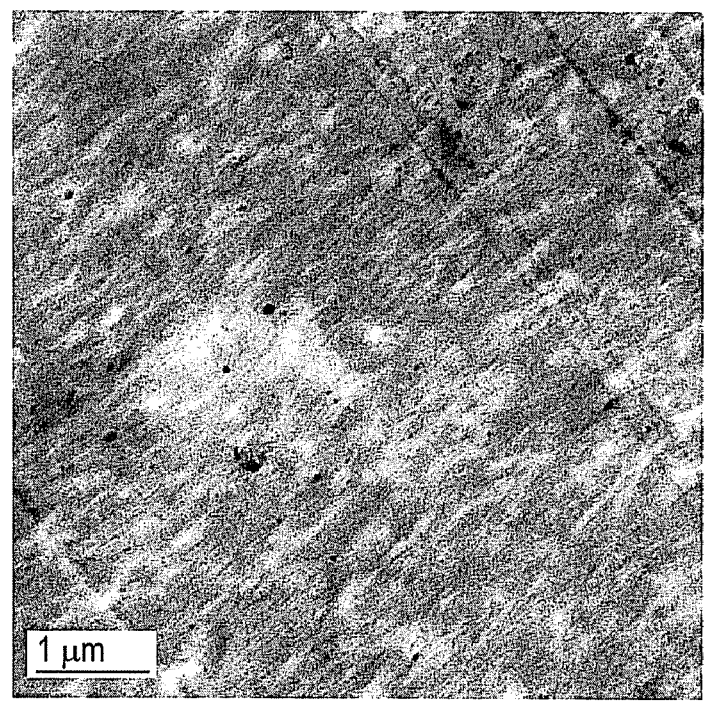
FIG. 6 is a TEM image of a molded sample of the composition of Example 6 (scale bar=1 micrometers).
Figure 7:
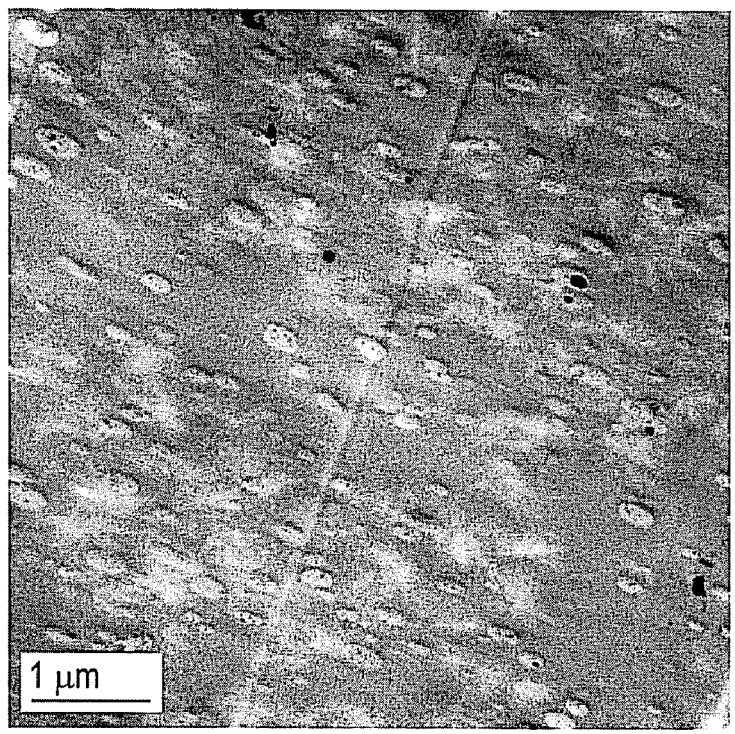
FIG. 7 is a TEM image of a molded sample of the composition of Example 7 (scale bar=1 micrometers).
Figure 8:
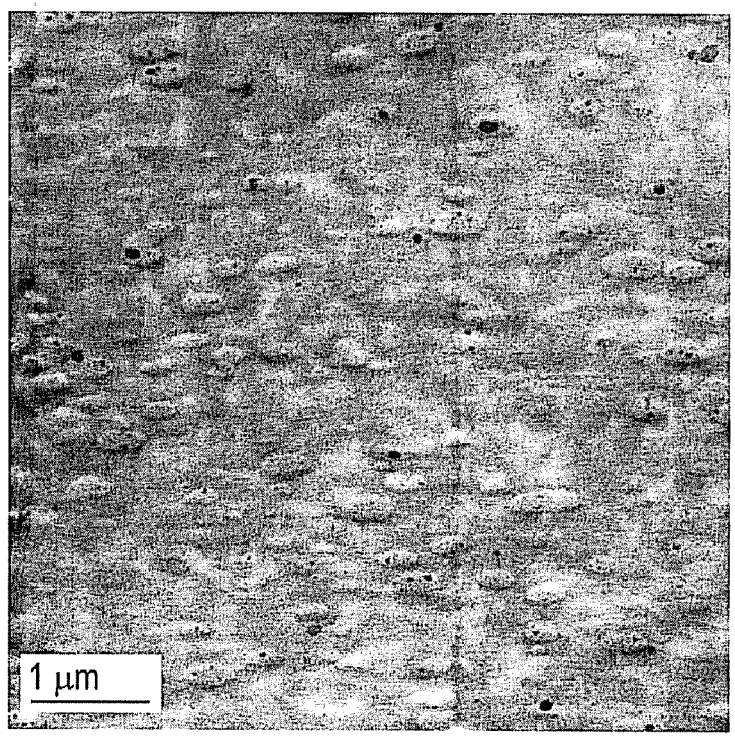
FIG. 8 is a TEM image of a molded sample of the composition of Example 8 (scale bar=1 micrometers).

These examples illustrate that compatible phase morphology is also obtained in thermoplastic molding compositions of PET-derived ionomeric PBT copolymer (See FIGS. 6-8) and virgin PET. The average particles sizes in examples 6, 7, and 8 are 0.15, 0.23, and 0.3 microns, respectively. All of the domains are thus sub-micron in size and hence indicate compatibility of blends. It is also interesting to note that the compatibilization is better at low levels of ionomeric, modified PBT copolymer content in the blend.

All references cited herein are incorporated by reference herein in their entirety. In addition, U.S. Pat. No. 6,495,079, U.S. Provisional Application Ser. No. 60/777,901 filed on Mar. 1, 2006, and U.S. Provisional Application Ser. No. 60/820,467 filed on Jul. 26, 2006 are each incorporated herein by reference in their entirety.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An ionomeric, modified poly(1,4-butylene terephthalate) copolymer comprising:
   polyester units comprising non-ionomeric ester units and ionomeric ester units substituted with an inorganic ionic group; and
   polyester units having at least one residue that is derived from a polyethylene terephthalate component selected from the group consisting of polyethylene terephthalate and polyethylene terephthalate copolymers,
   wherein the at least one residue derived from the polyethylene terephthalate component comprises a mixture of ethylene glycol residues and diethylene glycol residues.

2. The ionomeric, modified poly(1,4-butylene terephthalate) copolymer of claim 1, wherein the ionomeric ester units are present in the ionomeric copolymer in an amount from 0.05 to 5 mole percent of the total moles of ester units in the ionomeric copolymer.

3. The ionomeric, modified poly(1,4-butylene terephthalate) copolymer of claim 1, wherein inorganic ionic moieties are selected from the group consisting of nitrate groups, sulfate groups, phosphate groups, phosphonate groups, and sulfonate groups.

4. The ionomeric, modified poly(1,4-butylene terephthalate) copolymer of claim 1, wherein inorganic ionic groups are sulfonate groups.

5. The ionomeric, modified poly(1,4-butylene terephthalate) copolymer of claim 1, comprising divalent ionomer units of the formula:

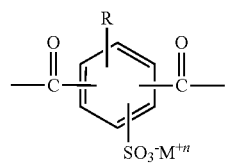

wherein R is hydrogen, halogen, $C_{1-8}$ alkyl or $C_{6-12}$ aryl; M is a metal, and n is 1 to 5.

6. The ionomeric, modified poly(1,4-butylene terephthalate) copolymer of claim 1, wherein the at least one residue derived from the poly(ethylene terephthalate) component is selected from the group consisting of ethylene glycol residues, diethylene glycol residues, isophthalic acid residues, antimony-containing compounds, germanium-containing compounds, titanium-containing compounds, cobalt-containing compounds, tin-containing compounds, aluminum-containing compounds, aluminum, aluminum salts, 1,3-cyclohexane dimethanol isomers, 1,4-cyclohexane dimethanol isomers, alkaline earth metal salts, alkali salts, phosphorous-containing compounds and anions, sulfur-containing compounds and anions, naphthalene dicarboxylic acids, 1,3-propane diol residues, and combinations thereof.

7. The ionomeric, modified poly(1,4-butylene terephthalate) copolymer of claim 1, wherein the residue derived from the poly(ethylene terephthalate) component further comprises isophthalic acid residues.

8. The ionomeric, modified poly(1,4-butylene terephthalate) copolymer of claim 1, wherein the at least one residue derived from the poly(ethylene terephthalate) component further comprises cobalt-containing compounds.

9. The ionomeric, modified copolymer of claim 8, wherein the at least one residue derived from the poly(ethylene terephthalate) component further comprises isophthalic acid residues.

10. The ionomeric, modified poly(1,4-butylene terephthalate) copolymer of claim 1, wherein the derived ester units are derived from a 1,4-butanediol that is derived from biomass.

11. The ionomeric, modified poly(1,4-butylene terephthalate) copolymer of claim 1, having a Tm from 210 to 220° C.

12. The ionomeric, modified poly(1,4-butylene terephthalate) copolymer of claim 1, having an intrinsic viscosity of 0.4 to 1 g/dL, as measured using 200 mg of the copolymer dissolved in 50 mL of a mixture containing 60 wt. % phenol and 40 wt. % tetrachloroethane at 25° C.

13. A composition comprising the ionomeric, modified poly(1,4-butylene terephthalate) copolymer of claim 1 and a thermoplastic polymer.

14. The composition of claim 13, wherein the thermoplastic polymer is a polyamide.

15. The composition of claim 14, wherein the polyamide is selected from the group consisting of nylon 6, nylon 6,6, and combinations thereof.

16. The composition of claim 14, wherein the polyamide is recycled.

17. The composition of claim 13, comprising, based on the total weight of the polymer components,
   from 2 to 98 wt. % of said ionomeric, modified poly(1,4-butylene terephthalate) copolymer;
   from 2 to 98 wt. % of the polyamide; and
   from 0 to 10 wt. % of a colorant.

18. The composition of claim 17, wherein the colorant is selected from the group consisting of inorganic cationic dyes, organic cationic dyes, and combinations thereof.

19. The composition of claim 13, wherein the at least one residue derived from the poly(ethylene terephthalate) component is selected from the group consisting of ethylene glycol residues, diethylene glycol residues, isophthalic acid residues, antimony-containing compounds, germanium-containing compounds, titanium-containing compounds, cobalt-containing compounds, tin-containing compounds, aluminum-containing compounds, aluminum, aluminum salts, 1,3-cyclohexane dimethanol isomers, 1,4-cyclohexane dimethanol isomers, alkaline earth metal salts, alkali salts, phosphorous-containing compounds and anions, sulfur-containing compounds and anions, naphthalene dicarboxylic acids, 1,3-propane diol residues, and combinations thereof.

20. The composition of claim 13, wherein the at least one residue derived from the poly(ethylene terephthalate) component comprises a mixture of ethylene glycol residues and diethylene glycol residues.

21. The composition of claim 13, wherein the residue derived from the poly(ethylene terephthalate) component further comprises isophthalic acid residues.

22. The composition of claim 13, wherein the at least one residue derived from the poly(ethylene terephthalate) component further comprises cobalt-containing compounds.

23. The composition of claim 13, wherein the at least one residue derived from the poly(ethylene terephthalate) component further comprises isophthalic acid residues.

24. The composition of claim 13, wherein the derived ester units are derived from a 1,4-butanediol that is derived from biomass.

25. The composition of claim 17, wherein a molded sample of the composition has less surface delamination than the same composition comprising a polyester without the ionomer units.

26. The composition of claim 17, wherein a molded sample of the composition has an average domain size of 0.1 to 1 micrometer.

27. The composition of claim 17, wherein the composition can be continuously spun for at least 4 hours without breaking.

28. An article comprising the composition of claim 17.

29. An article comprising a composition comprising, based on the total weight of the polymer components,
   from 2 to 98 wt. % of the ionomeric, modified poly(1,4-butylene terephthalate) copolymer comprising:
      polyester units comprising non-ionomeric ester units and ionomeric ester units substituted with an inorganic ionic group; and
      polyester units having at least one residue that is derived from a polyethylene terephthalate component selected from the group consisting of polyethylene terephthalate and polyethylene terephthalate copolymers;
   from 2 to 98 wt. % of the polyamide; and
   from 0 to 10 wt. % of a colorant;
   wherein the article is in the form of a spun fiber.

30. The article of claim 29, wherein the fiber does not delaminate.

31. The article of claim 30, wherein the fiber is a carpet fiber.

32. A process for the production of an ionomeric, modified poly(1,4-butylene terephthalate) copolymer, comprising:
   (a) depolymerizing a poly(ethylene terephthalate) component selected from the group consisting of poly(ethylene terephthalate) and poly(ethylene terephthalate) copolymers, in the presence of a 1,4-butanediol component and an aromatic dicarboxylic acid containing an inorganic ionic group, at a temperature from 180° C. to 230° C., under agitation, at a pressure that is at least atmospheric pressure in the presence of a catalyst component, under an inert atmosphere, to produce a molten mixture comprising a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing butylene terephthalate moieties, oligomers containing butylene isophthalate moieties, covalently bonded oligomeric moieties containing at least two of the foregoing moieties, 1,4-butanediol, ethylene glycol, and combinations thereof; and
   (b) increasing the temperature of the molten mixture with agitation and at subatmospheric pressure under conditions sufficient to form the ionomeric, modified poly(1,4-butylene terephthalate) copolymer.

33. The process of claim 32, wherein the 1,4-butanediol is used in step (a) in a molar excess amount, relatively to the poly(ethylene terephthalate) component of 2:1 to 3:1.

34. A process for the manufacture of an ionomeric, modified poly(1,4-butylene terephthalate) copolymer of claim 1, comprising:
   (a) reacting (i) a poly(ethylene terephthalate) component selected from the group consisting of poly(ethylene terephthalate) and poly(ethylene terephthalate) copolymers with (ii) a diol component selected from the group consisting of ethylene glycol, propylene glycol, and combinations thereof,
   in a reactor at a pressure that is at least atmospheric pressure in the presence of a catalyst component at a temperature ranging from 190° C. to 250° C., under an inert atmosphere, under conditions sufficient to depolymerize the poly(ethylene terephthalate), to form a first molten mixture comprising components selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, covalently bonded oligomeric moieties containing at least two of the foregoing moieties, ethylene glycol, propylene glycol and combinations thereof; wherein the poly(ethylene terephthalate) component and the diol component are combined under agitation;
   (b) adding 1,4-butanediol and an aromatic dicarboxylic acid or a chemical equivalent thereof containing an inorganic ionic group to the first molten mixture in a reactor in the presence of a catalyst component at a temperature from 190° C. to 240° C., under conditions that are sufficient to form a second molten mixture comprising a component selected from the group consisting of oligomers containing ethylene terephthalate moieties, oligomers containing ethylene isophthalate moieties, oligomers containing diethylene terephthalate moieties, oligomers containing diethylene isophthalate moieties, oligomers containing trimethylene terephthalate moieties, oligomers containing trimethylene isophthalate moieties, oligomers containing butylene terephthalate moieties, oligomers containing butylene isophthalate moieties, covalently bonded oligomeric moieties containing at least two of the foregoing moieties, 1,4-butanediol, propylene glycol, ethylene glycol, and combinations thereof; and (c) increasing the temperature of the second molten mixture under subatmospheric conditions and agitation to a temperature from 240° C. to 260° C., thereby forming the ionomeric copolymer of claim 1;

wherein an aromatic dicarboxylic acid containing an inorganic ionic group is added during the process prior to formation of the ionomeric, modified poly(1,4-butylene terephthalate) copolymer of claim 1.

35. The process of claim 34, wherein the aromatic dicarboxylic acid containing an inorganic ionic group is added to the reactor prior to the addition of the 1,4-butanediol.

36. The process of claim 34, wherein the aromatic dicarboxylic acid containing an inorganic ionic group is added to reactor during addition of the 1,4-butanediol.

37. The process of claim 34, wherein the 1,4-butanediol is added in a molar amount that is in at least 1.2 times molar excess relative to the molar amount of butanediol moieties incorporated into the modified polybutylene terephthalate copolymer component, and the aromatic dicarboxylic acid or a chemical equivalent thereof containing an inorganic ionic group is added in a molar amount that is in at least 1.2 times molar excess relative to the molar amount of ionic aromatic dicarboxylic acid or a chemical equivalent thereof incorporated into the ionomeric, modified poly(1,4-butylene terephthalate) copolymer.

38. The process of claim 34, wherein the step (b) is practiced for a sufficient period of time to reduce at least 65% of ethylene glycol from the second molten mixture.

39. The process of claim 34, wherein depolymerization of the polyethylene terephthalate component is carried out for at least 25 minutes.

40. The process of claim 34, wherein step (b) is carried out with excess 1,4-butanediol and at a pressure ranging from 30 to 150 kPa absolute.

41. The process of claim 34, wherein step (c) is carried out at a pressure that is less than 1.0 mbar.

42. The process of claim 34, wherein the process further comprises adding a basic compound during a step selected from the group consisting of step (a), step (b), step (c), and combinations thereof.

43. The ionomeric, modified poly(1,4-butylene terephthalate) copolymer of claim 1, wherein the copolymer is a random copolymer.

* * * * *